United States Patent
Trangbaek et al.

(10) Patent No.: US 11,867,521 B2
(45) Date of Patent: Jan. 9, 2024

(54) ADAPTIVE IN-DRIVE UPDATING OF VEHICLE ENERGY CONSUMPTION PREDICTION

(71) Applicant: GM GLOBAL TECHNOLOGY OPERATIONS LLC, Detroit, MI (US)

(72) Inventors: Klaus Trangbaek, Ein Vered (IL); Vladimir Suplin, Modiin (IL); Daniel Urieli, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 25 days.

(21) Appl. No.: 17/672,806

(22) Filed: Feb. 16, 2022

(65) Prior Publication Data

US 2023/0258464 A1 Aug. 17, 2023

(51) Int. Cl.
*G01C 21/34* (2006.01)
*B60W 20/20* (2016.01)
*B60W 40/105* (2012.01)

(52) U.S. Cl.
CPC ......... *G01C 21/3469* (2013.01); *B60W 20/20* (2013.01); *B60W 40/105* (2013.01); *G01C 21/3461* (2013.01); *B60W 2510/081* (2013.01); *B60W 2510/085* (2013.01)

(58) Field of Classification Search
CPC ........... G01C 21/3469; G01C 21/3461; B60W 2510/081; B60W 2510/085; B60W 20/20; B60W 40/105
See application file for complete search history.

(56) References Cited

U.S. PATENT DOCUMENTS

| | | | | |
|---|---|---|---|---|
| 2009/0299558 A1* | 12/2009 | Hidaka | ............... | G01C 21/3469 903/903 |
| 2011/0184600 A1* | 7/2011 | Kristinsson | ........ | G01C 21/3469 701/22 |
| 2014/0032087 A1* | 1/2014 | Shiri | ................... | G01C 21/3469 701/123 |
| 2015/0241227 A1* | 8/2015 | Ogawa | ................... | G01C 21/34 701/22 |

(Continued)

OTHER PUBLICATIONS

Energy-Efficient_UAV_Control_for_Effective_and_Fair_Communicationf.pdf (Year: 2018).*

*Primary Examiner* — Jeff A Burke
*Assistant Examiner* — Kyle T Johnson
(74) *Attorney, Agent, or Firm* — Quinn IP Law

(57) ABSTRACT

A system for adaptive in-drive updating, for a vehicle travelling on a route, includes a controller adapted to obtain a pre-drive energy consumption prediction for the route, via an energy consumption predictor. An in-drive updating module is selectively executable by the controller at a timepoint during the route at which a completed portion of the route has been traversed and a remaining portion remains untraversed. The controller is adapted to obtain an actual energy consumption for segments in the completed portion of the route. The controller is adapted to obtain at least one modification factor based on a comparison of the actual energy consumption and the pre-drive energy consumption prediction for the segments in the completed portion of the route. The pre-drive energy consumption prediction for the remaining portion of the route is adjusted based on the modification factor.

11 Claims, 2 Drawing Sheets

(56) References Cited

U.S. PATENT DOCUMENTS

| | | | |
|---|---|---|---|
| 2015/0369872 A1* | 12/2015 | Meyer | B60L 58/13 |
| | | | 702/63 |
| 2017/0146362 A1* | 5/2017 | Bai | G01C 21/3492 |
| 2018/0347997 A1* | 12/2018 | Fujimura | G01C 21/3469 |
| 2019/0228600 A1* | 7/2019 | Takeuchi | G08G 1/00 |
| 2019/0248359 A1* | 8/2019 | Miller | B60W 50/0097 |
| 2019/0265057 A1* | 8/2019 | Baglino | G01C 21/3469 |
| 2020/0089241 A1* | 3/2020 | Kao | G05D 1/0217 |
| 2020/0172081 A1* | 6/2020 | Sakayanagi | B60W 40/105 |
| 2022/0026228 A1* | 1/2022 | Kasioumis | G01C 21/28 |

\* cited by examiner

ADAPTIVE IN-DRIVE UPDATING OF VEHICLE ENERGY CONSUMPTION PREDICTION

INTRODUCTION

The present disclosure relates generally to updating the predicted amount of energy consumed by a vehicle. More specifically, the disclosure relates to a system and method for adaptive in-drive updating of the predicted energy consumption for a vehicle travelling on a route. In electric vehicles, predicting the amount of energy consumed by the vehicle along a specific route is valuable for a user who is planning a trip. Additionally, having a prediction of energy consumption by the vehicle during a trip may be useful to alleviate range anxiety in the user. However, due to various factors, the prediction (prior to the trip) of the amount of energy consumed by the vehicle may be imprecise.

SUMMARY

Disclosed herein is a system for adaptive in-drive updating for a vehicle travelling on a route. The system includes a controller adapted to obtain a pre-drive energy consumption prediction for the route, via an energy consumption predictor. The controller has a processor and tangible, non-transitory memory. An in-drive updating module is selectively executable by the controller at a timepoint during the route at which a completed portion of the route has been traversed and a remaining portion remains untraversed. The route is divided into a number of segments. Execution of the in-drive updating module causes the controller to obtain an actual energy consumption for the segments in the completed portion of the route. The controller is adapted to obtain at least one modification factor based on a comparison of the actual energy consumption and the pre-drive energy consumption prediction for the segments in the completed portion of the route. The pre-drive energy consumption prediction for the remaining portion of the route is adjusted based on the modification factor. The in-drive updates introduced by the system improve prediction accuracy, and result in better trip optimization for the driver.

In some embodiments, adjusting the pre-drive energy consumption prediction includes multiplying the at least one modification factor with the pre-drive energy consumption prediction for the segments in the remaining portion. In some embodiments, adjusting the pre-drive energy consumption prediction may include adding the at least one modification factor to the pre-drive energy consumption prediction for the segments in the remaining portion. The in-drive updating module may incorporate a machine learning model to adjust the pre-drive energy consumption prediction.

The modification factor may be based in part on a sum of the actual energy consumption in the segments and the sum of the pre-drive energy consumption prediction in the segments. The modification factor may be based in part on a clamping coefficient. The modification factor may be based in part on a respective weighting factor for the segments, the respective weighting factor being between zero and one, inclusive. The modification factor (Mi) applied at an ith segment, at a beginning of the remaining portion, may be obtained as:

$$Mi = \frac{[d + \sum_{j=1}^{i} w\_j a\_j]}{[d + \sum_{j=1}^{i} w\_j p\_j]},$$

where d is the damping coefficient, w_j is the respective weighting factor, a_j is the actual energy consumption in one of the segments of the completed portion and p_j is the pre-drive energy consumption prediction in one of the segments of the completed portion.

In some embodiments, the controller is programmed to update the pre-drive energy consumption prediction in a future segment in the remaining portion of the route based on similarity of a characteristic feature in the future segment to the characteristic feature in a past segment in the completed portion. The characteristic feature may be a speed of the vehicle. The characteristic feature may be a geographical classification of the route.

In some embodiments, the energy consumption predictor incorporates multiple modules, and the controller is programmed to sequentially update the multiple modules. The multiple modules may include a speed prediction module, a driving consumption prediction module and an HVAC consumption prediction module.

Disclosed herein is a method of adaptive in-drive updating for a vehicle travelling on a route divided into a number of segments, the vehicle having a controller with a processor and tangible, non-transitory memory. The method includes obtaining a pre-drive energy consumption prediction for the segments in the route, via an energy consumption predictor. An in-drive updating module is executed, via the controller, at a timepoint during the route at which a completed portion of the route has been traversed and a remaining portion remains untraversed. The method includes obtaining an actual energy consumption for the segments in the completed portion of the route. The method includes obtaining at least one modification factor based on a comparison of the actual energy consumption and the pre-drive energy consumption prediction for the segments in the completed portion of the route, via the controller. The pre-drive energy consumption prediction for the segments in the remaining portion of the route is adjusted based on the at least one modification factor.

The above features and advantages and other features and advantages of the present disclosure are readily apparent from the following detailed description of the best modes for carrying out the disclosure when taken in connection with the accompanying drawings.

Figure 1:
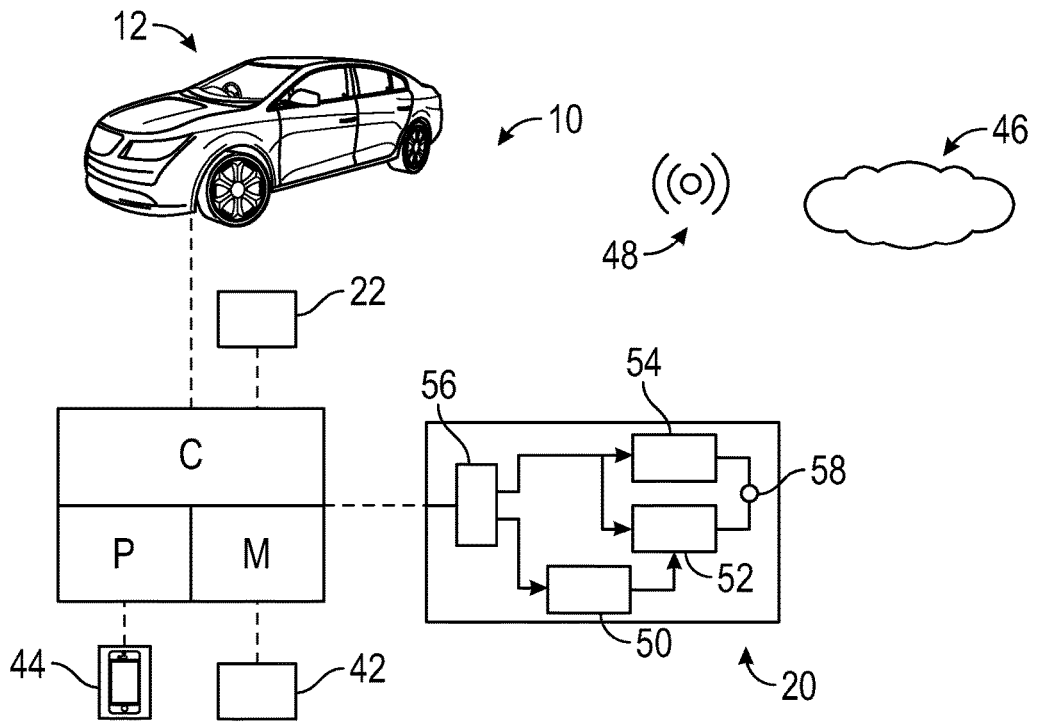
FIG. 1 is a schematic fragmentary diagram of a system for adaptive in-drive updating of energy consumption prediction for a vehicle.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates an adaptive in-drive updating system 10 (referred to as "system" hereinafter) for a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, airplane and train. The vehicle 12 may be an electric vehicle, which may be purely electric or hybrid/partially electric. It is to be understood that the vehicle 12 may take many different forms and have additional components.

Figure 2:
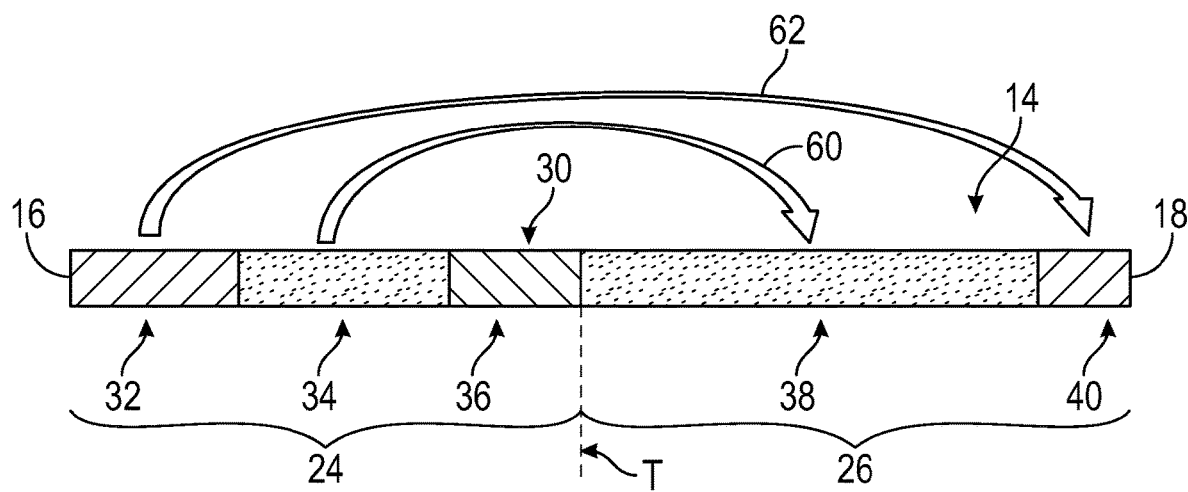
FIG. 2 is a schematic fragmentary diagram illustrating a route traveled by the vehicle of FIG. 1.

Referring to FIG. 1, the system 10 includes a controller C having at least one processor P and at least one memory M (or non-transitory, tangible computer readable storage medium) on which instructions may be recorded for executing a method 100 (described below with respect to FIG. 3). The system 10 (via execution of method 100) enables in-drive updating of the predicted energy consumption of the vehicle 12 travelling on a route. An example route 14 is shown in FIG. 2, beginning at origin 16 and ending at destination 18. The controller C has access to and selectively executes an energy consumption predictor 20 and an in-drive updating module 22, shown in FIG. 1.

Given a specific route, the vehicle 12 may present the user with a prediction of the energy consumption. Prior to the drive, the route 14 may be planned, segmented and characterized in terms of static and real time features. These features are used to predict the energy that will be consumed in order to complete the route 14. The planned route, along with other factors, e.g., distance, altitude, live traffic, weather, driver characteristics etc. are fed into the energy consumption predictor 20 (which may be a physics model, a machine learning model or other type of model) to obtain the predicted fuel or energy consumption.

The system 10 provides an architecture for updating the predictions in a robust and accurate way. Referring to FIG. 2, the in-drive updating module 22 is executed at a timepoint T at which a completed portion 24 has been traversed by the vehicle 12 while the remaining portion 26 has not been travelled. In other words, the in-drive updating module 22 is run in real-time while the vehicle 12 continues to remain on the route 14.

The controller C of FIG. 1 may be an integral portion of, or a separate module operatively connected to, other controllers of the vehicle 12. For example, the controller C may be an electronic control unit (ECU) of the vehicle 12. The memory M can store controller-executable instruction sets, and the processor P can execute the controller-executable instruction sets stored in the memory M.

Referring to FIG. 2, the route 14 may be divided into multiple different segments 30. In the example shown, the segments 30 include a first segment 32, second segment 34, third segment 36, fourth segment 38 and fifth segment 40. Each individual segment 30 may be made up of multiple smaller segments or sub-segments in the collecting and processing phase. In one embodiment, the segments 30 may be about 4 kilometers each. The sizes of the segments 30 may vary.

Referring to FIG. 1, the pre-drive route plan may be entered through a communications interface 42 that is accessible to a user or operator of the vehicle 12. For example, a route planner may generate candidate routes and send them to the predictor to get their predicted consumption, which helps in selecting an energy efficient route. The communications interface 42 may include a touchscreen or other IO device and may be integrated in the infotainment unit of the vehicle 12. In some embodiments, the route plan may be entered through a mobile application 44 that is in communication with the controller C. For example, the mobile application 44 may be physically connected (e.g., wired) to the controller C as part of the vehicle infotainment unit. The mobile application 44 may be embedded in a smart device belonging to a user of the vehicle 12 and plugged or otherwise linked to the vehicle 12. The circuitry and components of a mobile application 44 ("apps") available to those skilled in the art may be employed. The communications interface 42 may also be employed for vehicle-to-vehicle (V2V) communication and/or a vehicle-to-everything (V2X) communication.

The in-drive updating module 22 and/or the energy consumption predictor 20 may be stored in the vehicle 12. In some embodiments, the in-drive updating module 22 and/or the energy consumption predictor 20 may be stored in a remotely located or "off-board" cloud computing service, referred to herein as cloud unit 46, that interfaces with the controller C and/or a mobile application. The cloud unit 46 may include one or more servers hosted on the Internet to store, manage, and process data, maintained by an organization, such as for example, a research institute or a company. The in-drive updating module 22 may be updateable via remote updates.

Referring to FIG. 1, the controller C may be configured to communicate with the cloud unit 46 via a wireless network 48. The wireless network 48 of FIG. 1 may be a short-range network or a long-range network. The wireless network 48 may be a communication BUS, which may be in the form of a serial Controller Area Network (CAN-BUS). The wireless network 48 may incorporate a Bluetooth™ connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

Figure 3:
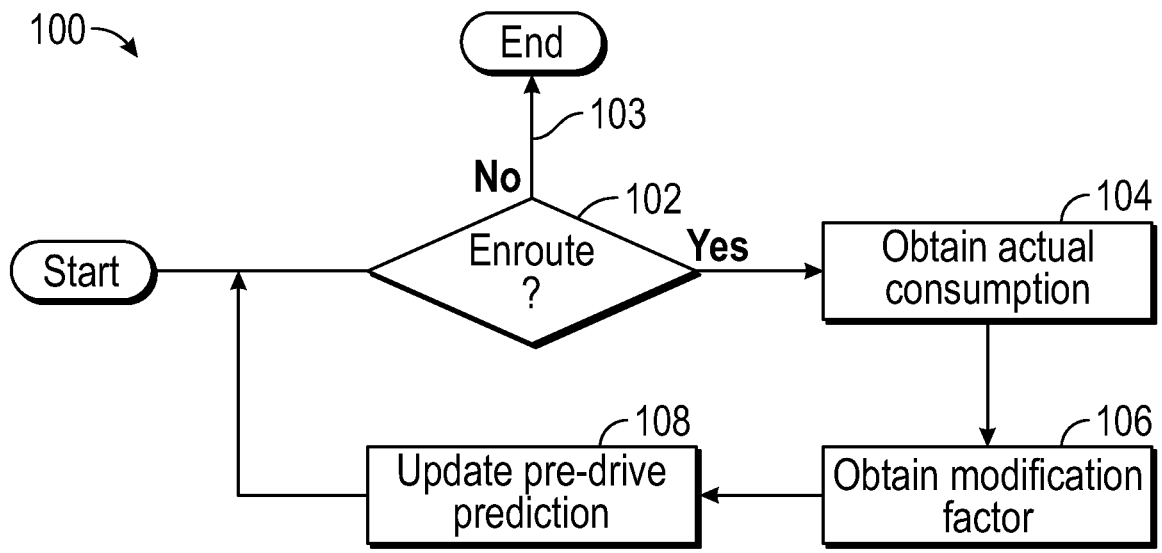
FIG. 3 is a flowchart of an example method for adaptive in-drive updating of energy consumption prediction for the vehicle of FIG. 1.

Referring now to FIG. 3, an example flowchart of the method 100 is shown. Method 100 may be embodied as computer-readable code or instructions stored on and partially executable by the controller C of FIG. 1. Method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The method 100 begins or is triggered when the vehicle 12 begins travelling on the route 14. Per block 102 of FIG. 3, the method 100 includes determining if the vehicle 12 is continuing to travel on the route 14. If so, the method 100 advances to block 104 of FIG. 3, where the controller C is programmed to obtain the actual energy consumption for the segments 30 in the completed portion 24 of the route 14. The controller C also retrieves the pre-drive energy consumption prediction for segments 30 in the completed portion 24 of the route 14, from the energy consumption predictor 20.

Proceeding to block 106 of FIG. 3, the controller C is programmed to obtain at least one modification factor ("at least one" omitted henceforth) based on a comparison of the pre-drive energy consumption prediction for the segments 30 in the past (i.e., completed portion 24 of the route 14) and the actual energy consumption for the same segments (obtained in block 104). A separate modification factor may be obtained for each of the segments 30 in the future (i.e., remaining portion 26 of the route 14).

Adjusting the pre-drive energy consumption prediction may include multiplying the modification factor with the pre-drive energy consumption prediction for the segments 30 in the remaining portion 26, for example, by multiplying pre-drive predictions in the future by the ratio between the past actual consumption (sum of the actual energy consumption for the segments 30 in the completed portion 24) and the past pre-drive predictions (sum of the pre-drive energy consumption prediction in the completed portion 24).

The modification factor may be based in part on a damping coefficient (d). Here, the modification factor (applied at an ith segment at a beginning of the remaining portion 26) is obtained as:

$$Mi = \frac{\left[d + \sum_{j=1}^{i} a\_j\right]}{\left[d + \sum_{j=1}^{i} p\_j\right]},$$

where d is the damping coefficient, a_j is the actual energy consumption in a single segment j, $\sum_{j=1}^{i} a\_j$ is the sum of the actual energy consumption in the segments 30 of the completed portion 24 and p_j is the pre-drive energy consumption prediction in a single segment j, $\sum_{j=1}^{i} p\_j$ is the sum of the pre-drive energy consumption prediction in the segments 30 of the completed portion 24. The damping or "forgetting" factor may be constrained or calibrated based on the application at hand.

The modification factor may be based in part on a respective weighting factor for the segments 30. The respective weighting factor is between zero and one, inclusive, and may be tailored to add greater weight to the recent past segments and less weight to the older past segments. The modification factor (Mi) applied at the ith segment at the beginning of the remaining portion 26 may be obtained as:

$$Mi = \frac{\left[d + \sum_{j=1}^{i} w\_ja\_j\right]}{\left[d + \sum_{j=1}^{i} w\_jp\_j\right]},$$

where w_j is the respective weighting factor.

Adjusting the pre-drive energy consumption prediction may include adding the modification factor to the pre-drive energy consumption prediction for the segments 30 in the remaining portion 26. Here, the modification factor is obtained as the average difference between the actual energy consumption per segment and the pre-drive predicted energy consumption per segment.

In some embodiments, the in-drive updating module 22 incorporates a machine learning model, such as a machine learning adaptive predictor, to adjust the pre-drive predicted energy consumption or obtain the modification factor. While the approach is described herein as providing a modification factor, it is understood that the in-drive updating module 22 may output adaptive predictions directly without an explicit modification factor involved. The machine learning model may include but is not limited to, a neural network, a simple linear regression model, a support vector regression model and other types of machine learning models available to those skilled in the art. For example, the machine learning model may be a feedforward artificial neural network having an input layer, one or more hidden layers and an output layer. Each layer is composed of respective nodes configured to perform an affine transformation of a linear sum of inputs. The respective nodes are independent and characterized by a unique set of weights. In some embodiments, the in-drive updating module 22 may incorporate a machine learning model (e.g., neural network) that is trained to predict the actual energy consumption in segment number X with the following inputs: (1) the features of segment 1 to segment (X−1), (2) the actual energy consumption from segment 1 to segment (X−1); and (3) the features of segment X.

Advancing to block 108 of FIG. 3, the method 100 includes adjusting the pre-drive energy consumption prediction for the remaining portion 26 of the route 14 based on the modification factor(s) obtained in block 106. As described above, the adjustment may be multiplicative, additive, extrapolative or a machine-learning based algorithm. After the adjustment in block 108, the method 100 loops back to block 102 to determine if the vehicle 12 is continuing to travel on the route 14. If the route 14 has been completed, the method 100 is ended (as indicated by line 103). If the vehicle 12 remains on the route 14, the process is repeated at block 104.

Method 100 may be applied to both monolithic and modular architectures. In some embodiments, the energy consumption predictor 20 is characterized by a modular architecture with multiple modules that act sequentially or in tandem to obtain the predicted energy consumption. Referring to FIG. 1, for example, the energy consumption predictor 20 may include a speed prediction module 50, a driving consumption module 52 and an HVAC (heating, ventilation and air-conditioning) consumption module 54. The multiple modules receive as input information such as route data, weather data and traffic data, via a feature extractor 56. The speed prediction module 50 models driving style to predict the speed of the vehicle 12, which is outputted to the driving consumption module 52. The driving consumption module 52 is adapted to predict a driving energy or primary energy consumed for purposes of moving the vehicle 12. The HVAC consumption module 54 is adapted to predict the secondary energy consumed by an HVAC unit of the vehicle 12. The outputs of the driving consumption module 52 and HVAC consumption module 54 are summed or added together in the total consumption module 58 to predict the pre-drive energy consumption in each of the segments 30 for the specific route plan.

In such a modular architecture, the updates (to the pre-drive energy consumption prediction) are performed sequentially. In the above architecture, the updating may be performed as described below. The controller C is adapted to first compare the predicted HVAC consumption and the predicted speed to past measurements of HVAC consumption and speed, respectively. Next, the future HVAC consumption and future speed predictions are updated. The controller C is adapted to recalculate the past consumption prediction with the measured speed (in block 52). Finally, the re-calculated consumption prediction is compared to the measured consumption and the future consumption prediction is updated accordingly also based on the updated speed (from above).

In some embodiments, the method 100 includes updating predictions according to route similarities or a characteristic feature. For each future segment, the controller C may be programmed to find the most similar segment(s) in the past or having the closest value of the characteristic feature. In other words, the controller C is programmed to update the pre-drive energy consumption prediction in a future segment (e.g., fourth segment 38) in the remaining portion 26 of the route 14 based on similarity of a characteristic feature in the future segment to the characteristic feature in a past segment (e.g., second segment 34) in the completed portion 24. The characteristic feature may be the geographical classification (e.g., city, highway, mountainous) of the segments 30. For example, if the first, second, third, fourth and fifth segments 32, 34, 36, 38, 40 are classified as highway, city, mountainous, city and highway respectively, predictions in the future city segment (fourth segment 38) will be adapted (see arrow 60) according to prediction and actual consumption in the past city segment (second segment 34). Predictions in the future highway segment (fifth segment 40) may be adapted (see arrow 62) according to prediction and actual consumption in the past highway segment (first segment 32).

Figure 4:
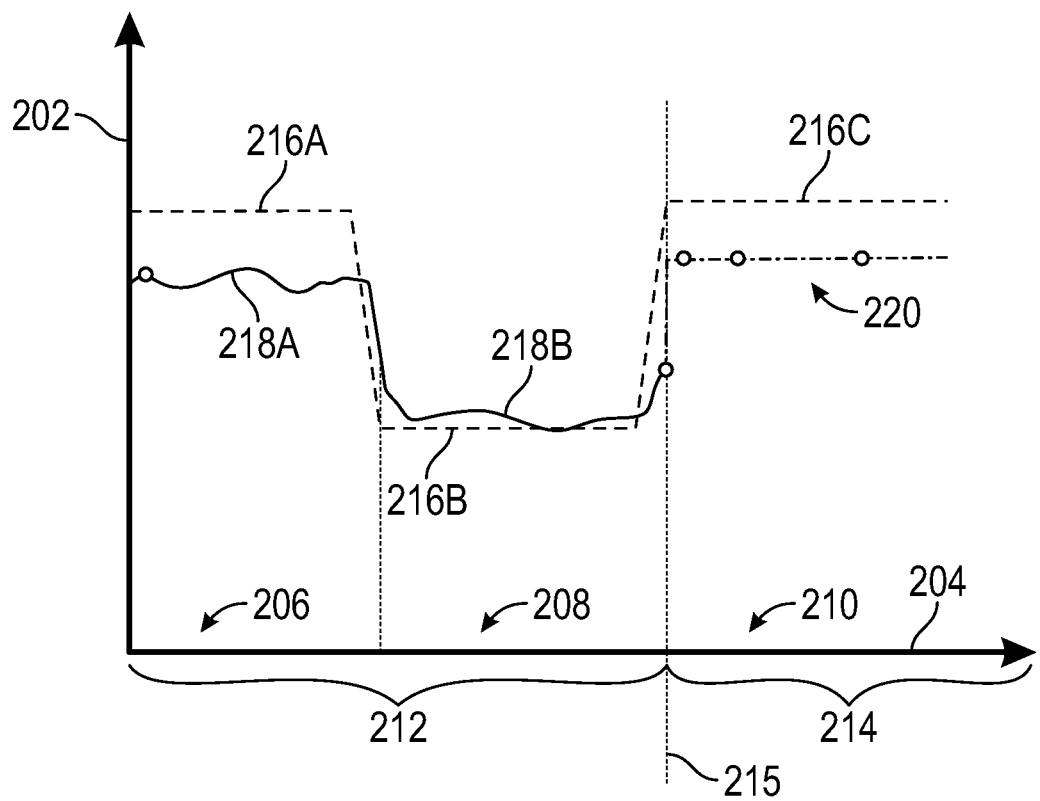
FIG. 4 is a diagram illustrating example traces of pre-drive predicted speed, actual speed and updated predicted speed for the vehicle of FIG. 1.

The characteristic feature may be the speed of the vehicle 12. An illustrative example of similarity-based speed prediction is shown in FIG. 4. Referring to FIG. 4, an example graph is shown with speed on the vertical axis 202 and the distance traveled along a route on the horizontal axis 204. The route here includes at least a first segment 206, a second segment 208 and a third segment 210. Referring to FIG. 4, at a present time 215, a completed portion 212 has been traversed by the vehicle 12 while a remaining portion 214 has not been travelled. Traces 216A, 216B and 216C show the respective pre-drive speed prediction for the first segment 206, the second segment 208 and the third segment 210. Traces 218A and 218B show the actual speed along the first segment 206 and the second segment 208, respectively. Referring to FIG. 4, the future speed prediction in third segment 210 is adapted according to the first segment 206 where the initial predictions of speed are similar. Trace 220 shows the modified or updated pre-drive speed prediction for the third segment 210.

In summary, the system 10 (via execution of the method 100) combines a predefined route prediction with a robust way of obtaining in-drive updates. The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 3 illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for adaptive in-drive updating for a vehicle travelling on a route, the system comprising:
   a controller adapted to obtain a pre-drive energy consumption prediction for the route via an energy consumption predictor, the controller having a processor and tangible, non-transitory memory;
   an in-drive updating module selectively executable by the controller at a timepoint during the route at which a completed portion of the route has been traversed and a remaining portion remains untraversed, the route being divided into a number of segments, execution of the in-drive updating module causing the controller to:
      obtain an actual energy consumption for the segments in the completed portion of the route;
      obtain at least one modification factor based in part on a damping coefficient, a respective weighting factor for the segments, a sum of the actual energy consumption in the segments, and the sum of the pre-drive energy consumption prediction for the segments in the completed portion of the route, the respective weighting factor being between zero and one, inclusive; and
      adjust the pre-drive energy consumption prediction for the segments in the remaining portion of the route based on the at least one modification factor, including multiplying the at least one modification factor by the pre-drive energy consumption prediction for the segments in the remaining portion;
   wherein the at least one modification factor (Mi) is applied at an ith segment at a beginning of the remaining portion and obtained as:

$$Mi = \frac{\left[d + \sum_{j=1}^{i} w\_j a\_j\right]}{\left[d + \sum_{j=1}^{i} w\_j p\_j\right]},$$

where d is the damping coefficient, w_j is the respective weighting factor, a_j is the actual energy consumption in one of the segments of the completed portion and p_j is the pre-drive energy consumption prediction in one of the segments of the completed portion; and
   wherein operation of the vehicle on the remaining portion of the route is modified based on the adjusted pre-drive energy consumption prediction for the segments in the remaining portion of the route.

2. The system of claim 1, wherein the in-drive updating module incorporates a machine learning model to adjust the pre-drive energy consumption prediction.

3. The system of claim 1, wherein adjusting the pre-drive energy consumption prediction includes adding the at least one modification factor to the pre-drive energy consumption prediction for the segments in the remaining portion.

4. The system of claim 1, wherein the controller is programmed to update the pre-drive energy consumption prediction in a future segment in the remaining portion of the route based on similarity of a characteristic feature in the future segment to the characteristic feature in a past segment in the completed portion.

5. The system of claim 4, wherein the characteristic feature is a speed of the vehicle.

6. The system of claim 4, wherein the characteristic feature is a geographical classification of the route.

7. The system of claim 1, wherein the energy consumption predictor incorporates multiple modules, and the controller is programmed to sequentially update the multiple modules.

8. The system of claim 7, wherein the multiple modules include a speed prediction module, a driving consumption prediction module and an HVAC consumption prediction module.

9. A method of adaptive in-drive updating for a vehicle travelling on a route divided into a number of segments, the vehicle having a controller with a processor and tangible, non-transitory memory, the method comprising:
   obtaining a pre-drive energy consumption prediction for the segments in the route, via an energy consumption predictor;
   executing an in-drive updating module, via the controller, at a timepoint during the route at which a completed portion of the route has been traversed and a remaining portion remains untraversed;
   obtaining an actual energy consumption for the segments in the completed portion of the route;
   obtaining at least one modification factor based in part on a damping coefficient, a respective weighting factor for the segments, a sum of the actual energy consumption and the pre-drive energy consumption prediction for the segments in the completed portion of the route, via the controller, the respective weighting factor being between zero and one, inclusive; and
   adjusting the pre-drive energy consumption prediction for the segments in the remaining portion of the route based on the at least one modification factor, including multiplying the at least one modification factor by the pre-drive energy consumption prediction for the segments in the remaining portion;
   applying the at least one modification factor (Mi) at an ith segment at a beginning of the remaining portion such that $$Mi = \frac{\left[d + \sum_{j=1}^{i} w\_j\, a\_j\right]}{\left[d + \sum_{j=1}^{i} w\_j\, p\_j\right]},$$

where d is the damping coefficient, w_j is the respective weighting factor, a_j is the actual energy consumption in one of the segments of the completed portion and p_j is the pre-drive energy consumption prediction in one of the segments of the completed portion; and
   controlling operation of the vehicle on the remaining portion of the route based on the adjusted pre-drive energy consumption prediction for the segments in the remaining portion of the route.

10. The method of claim 9, further comprising:
   incorporating a machine learning model in the in-drive updating module to adjust the pre-drive energy consumption prediction.

11. The method of claim 9, further comprising:
   updating the pre-drive energy consumption prediction in a future segment in the remaining portion of the route based on similarity of a characteristic feature in the future segment to a past segment in the completed portion.

* * * * *